(12) United States Patent
Pinchot (10) Patent No.: US 7,530,806 B2
(45) Date of Patent: May 12, 2009

(54) PULSE WAVE MODULATOR CUTTING ASSEMBLY

(75) Inventor: James M. Pinchot, Parma, OH (US)

(73) Assignee: JMP Industries, Inc., Cleveland, OH (US)

( * ) Notice: Subject to any disclaimer, the term of this patent is extended or adjusted under 35 U.S.C. 154(b) by 4 days.

(21) Appl. No.: 11/824,350

(22) Filed: Jun. 29, 2007

(65) Prior Publication Data

US 2007/0259067 A1 Nov. 8, 2007

Related U.S. Application Data

(63) Continuation of application No. 11/062,220, filed on Feb. 18, 2005, now abandoned.

(60) Provisional application No. 60/548,693, filed on Feb. 27, 2004.

(51) Int. Cl.
*B29C 47/08* (2006.01)

(52) U.S. Cl. .................. 425/142; 425/149; 425/192 R; 425/202; 425/309; 425/313

(58) Field of Classification Search .................. 425/140, 425/141, 142, 149, 202, 207, 209, 308, 310, 425/311, 313, 190, 192 R, 461, 463, 464, 425/466, 467
See application file for complete search history.

(56) References Cited

U.S. PATENT DOCUMENTS

| | | | |
|---|---|---|---|
| 2,583,600 A * | 1/1952 | Schreiber | 425/191 |
| 3,500,541 A | 3/1970 | Hammerlund, Jr. et al. | |
| 4,422,372 A | 12/1983 | Hoezee | |
| 4,462,470 A * | 7/1984 | Alexander et al. | 175/72 |
| 4,767,301 A | 8/1988 | Volk, Jr. | |
| 4,938,605 A | 7/1990 | Friedrich | |
| 5,122,315 A | 6/1992 | Darley | |
| 5,286,185 A | 2/1994 | Tashiro et al. | |
| 6,514,442 B1 | 2/2003 | Hiraoka et al. | |
| 2005/0249834 A1 | 11/2005 | Williams | |

\* cited by examiner

*Primary Examiner*—Yogendra Gupta
*Assistant Examiner*—Emmanuel S Luk
(74) *Attorney, Agent, or Firm*—Fay Sharpe LLP; Brian E. Turung (57) ABSTRACT

A cutting assembly for cutting a material extruded from a die can include a wiper adapted to connect to an auger or a rotating member, a die holder plate disposed adjacent the wiper, a cutter member disposed downstream from the die holder plate, and a pressure sensor.

38 Claims, 6 Drawing Sheets

PULSE WAVE MODULATOR CUTTING ASSEMBLY

This patent application is a continuation of U.S. patent application Ser. No. 11/062,220 filed Feb. 18, 2005, now abandoned which in turn claims the benefit of U.S. provisional patent application Ser. No. 60/548,693, filed Feb. 27, 2004, which is incorporated by reference herein in its entirety.

BACKGROUND OF THE INVENTION

The present invention relates to extruder devices and more particularly to a cutting assembly to cut materials that have been extruded through a die.

SUMMARY

The present invention is directed to an improved cutting assembly used to cut materials that have been extruded through one or more dies. The cutting assembly of the present invention is particularly directed the cutting of extruded catalyst; however, the cutting assembly can be used to cut many other types of extruded material.

The improved cutting assembly is designed to improve the product quality of cut extruded material by cutting the extruded material to a certain specified length. In the catalyst business, the length to diameter ratio (L/D ratio) is selected to control certain types of chemical reactions. It is common for a chemical reaction to be simulated in a laboratory before assembling a full scale commercial facility. When the chemical process developed in the laboratory is converted into a full scale commercial facility, the flow rates of the chemical components and the size of the catalyst, if any, are scaled up to attempt to match the results obtained in the laboratory. The L/D ratio of the catalyst is commonly used to scale up the catalyst for use in such industrial scale processes. The L/D ratio of the catalysts is important in many chemical reactions in that the surface area of the catalysts affects the rate at which certain chemical reactions proceed. In the past, extruded catalysts that were within about 200% of the desired length dictated by the L/D ratio were acceptable for use in a chemical process. For instance, if a desired length of the catalyst was 0.5 inch, catalysts that ranged from 0.25 (50%) to 1.5 (200%) inches in length were generally considered acceptable. Many catalysts are extruded from a die and cut by a cutter within an acceptable L/D range. Typically, about 15-35% of the cut catalyst fell within about 200-300% of the desired length of the catalyst. In the past, a catalyst that was within about 200% of the desired L/D ratio was designated as being acceptable for use in a chemical process. If the acceptable range for the L/D ratio of the catalysts was narrower, more expensive processes such as pill manufacturing processes were used to produce the catalysts. Although the pill manufacturing processes produced a large percentage of catalyst having a desired L/D ratio, the pill manufacturing process has extremely slow throughputs, resulting in low output over time and significantly increased manufacturing costs. Such high costs are cost prohibitive for many chemical processes.

The improved cutting assembly of the present invention is designed to cut a catalyst extruded from a die to form a cut product that more closely matches the desired L/D ratio of the catalyst, thereby eliminating the need for forming the catalysts by more expensive processes that have lower throughputs. The present invention also is directed to an extrusion cutting assembly which can increase the quantity of cut product while still producing a product having an L/D ratio which is significantly closer to the desired L/D ratio as compared to catalysts cut by prior art cutting assemblies.

The improved cutting assembly incorporates several new technologies that are used to produce a higher quality product. Each one of these new technologies individually result in increased product quality. In addition, the combination of these new technologies further increases the percentage for producing product having an acceptable L/D ratio. Prior cutting systems only results in about 15-35% of the cut product being within 200% of the desired length. The cutting assembly of the present invention results in about 60-99.9% of the cut product being within about 200% of the desired length, and typically about 70-99.9% of the cut product being within about 100% of the desired length. The cutting assembly of the present invention produces a higher quality product with significantly less waste. The cutting assembly of the present invention also has higher throughputs without sacrificing product quality.

One improvement of the cutting assembly includes the use of an increased number of wipers positioned closely adjacent to the openings in the die support plate. The wipers are used to direct material to be extruded into the openings for extrusion through the dies positioned in the openings. The wipers are also used to reduce or eliminate the amount of space around the openings that can harbor material, thereby reducing or eliminating the amount of material that stagnates or accumulates around the openings. Material that stagnates or accumulates around the openings can become hardened or less formable. This hardened or less formable material will eventually work its way into one of the openings. Due to the hardened or less formable nature of the material, the material can become stuck in the opening, thereby resulting in a clogged opening. The clogging of the opening reduces the number of dies that are used to form the extruded product, thereby reducing the amount of product being produced. The clogging of one or more dies also affects the pressure at which the material is extruded through the remaining unclogged openings. For instance, a plate which includes four openings would suddenly encounter a pressure increase of at least about 15-35% in the three unclogged openings when one of the openings becomes clogged. The increased pressure exerted on the extruded material results in the material being forced through the openings at an increased rate, thereby resulting in the lengths of the cut catalysts being increased when the cutting blade is running at a constant speed. The increased cut product typically results in an unacceptable product due to the unacceptably long product length, thus reducing the yield of acceptable product. The increased pressure on the material may adversely affect the material (i.e. adversely breaking down chemical bonds or structures, unacceptably increasing the heat applied to the material thereby resulting in adverse chemical reactions or structural formations, etc.). Such adverse affects on the extruded material can result in the material being unacceptable for its end use even if the cut length is within an acceptable range. The wiper blades of the improved cutting assembly are designed to reduce or eliminate the space about the openings that can harbor material to be extruded, thereby reducing or eliminating the incidence of one or more of the openings becoming clogged during an extruding process. The wiper blades are also used to reduce the pressure variations of the material being directed into the openings of the die holder. Typically, an auger is used to direct the material to be extruded toward the openings in the die holder plate. Most of these augers have a single flight configuration; however, dual flight configurations can be used. As the auger is rotated, the material to be extruded is moved toward the openings in the die holder plate.

An opening in the die holder plate that is positioned closest to the face of the blade of the auger at a certain time is exposed to a higher pressure by the material than another opening on the die holder plate which is positioned at a farther distance from the blade face of the auger. As a result, when the auger is rotated during the operation, the pressure being applied to the extruded material at a particular opening increased as the face of the blade approaches a particular opening in the die holder plate and then decreases after the face of the blade passes the opening and moves to another opening as the auger rotates. The increasing and decreasing pressure being exerted on the material through the opening results in the material being accelerated and decelerated through the openings as the auger rotates. The increased speed at which the material passes through an opening results in an increased length of the material being cut when the cutter blade is rotated at a constant speed. The reduced speed at which material passes through an opening results in a reduced length of material being cut when the cutter blade is rotated at a constant speed. As a result, the cut material constantly varies in length due in part to the rotation of the auger feeding the material to be extruded through the die plates. The use of multiple wiper blades positioned between the end of the auger and the openings in the die holder plate results in a reduction of the pressure amplitude differential between a high and low pressure situation, thereby resulting in a more constant pressure being applied to the material directed into the plurality of openings in the die holder plate. As a result, the length of the cut material is more uniform due to the relatively constant pressure being applied on the material at all the openings in the die holder plate, thereby resulting in a higher percentage of acceptable product being produced. In one particular design, the number of wiper blades used in the improved cutting assembly is equal to or greater than the number of openings in the die holder plate. As can be appreciated, the number of wiper blades can be less than the number of openings in the die holder plate and still result in an improvement in the percentage of acceptable product. Typically, the wiper blades are connected to the end of the auger and are positioned closely adjacent to the openings in the die holder plate so as to reduce the amount of area about an opening which can harbor stagnant material. In another and/or alternative design, the wiper blades are sized so that they are at least as large as the openings in the die holder plate so as to facilitate in directing material into the openings. In another particular design, the size of the wiper blades are no more than about 30% larger than the diameter of the openings in the die holder plate so as to reduce the amount of dead area about the opening when a particular wiper blade passes by and over the opening, thereby reducing the amount of stagnant material which can become entrapped or stagnant about the opening or within the wiper area. It has been found that by properly designing the wiper blades, the amount of cut product that is within 100% or less of the desired cut length improves from 25% based upon standard cutting apparatuses to at least about 80%. This significant improvement in the amount of acceptable product reduces the amount of product that must be disposed of due to the fact that the cut length is too long or short, thus having an unacceptable deviation from the desired L/D ratio.

Another and/or alternative improvement of the improved cutting assembly is an improved control arrangement which can vary the cutting blade speed to better account for the pressure differentials applied to the material being extruded through a die in a particular opening of the die holder plate. When the pressure on the extruded material increases, the material travels at a faster rate through the die. Conversely, when the pressure on the extruded material reduces, the extruded material passes at a slower rate through the die. By detecting the pressure of the material as it enters into one or more openings in the die holder plate, it can be determined whether the material is accelerating, decelerating, or maintaining a constant velocity through the die within the die holder plate. If it is detected that the pressure has decreased, the speed of the blade can be accordingly decreased. If it is found that the pressure of the material has increased, the speed of the blade can be accordingly increased. Furthermore, if it is found that the pressure is constant, the speed of the blade can be maintained as constant. As a result, the control of the blade speed used to cut the material that has been extruded through one or more dies can be controlled so as to maintain a desired cut length of the cut extruded material. The rate of increase or decrease of the blade speed can be linear or non-linear. In addition, the change in blade speed can be delayed to account for the time that the material enters into the opening in the die holder plate and passes through the die prior to being cut by the blade. In one particular design, a pulse width modulator control system is used to control the rate at which the cutting blade cuts the material being extruded from one or more dies. As can be appreciated, other control systems can be used. In another particular design, the number of cutting blades selected can be the same as the number of dies being used to extrude the material. The control of the blade speed with respect to the detected pressure can also be used to adjust the cutting blade speed to account for abnormalities in the feed rate of the material being extruded. For instance, when one or more of the openings for the extruded material is clogged, thereby resulting in a significant increase in pressure on the extruded material through the remaining unclogged openings, the velocity of the cutting blade can be increased to account for the increased speed at which the material is extruded through the remaining unclogged openings. In another and/or alternative situation, the pressure applied to the openings in the die holder plate varies due to the feeding of the material by the auger or other type of feeding device. Even if wiper blades are used to decrease the range of pressure fluctuations, the changes in pressure being applied to the material being extruded resulting in increased and decreased velocities through the dies. The detection of these pressure fluctuation can be used to increase and/or decrease the cutting blade speed to obtain more cut product having a length within an acceptable length. In another and/or alternative situation, the rate at which material is fed into a feeder (e.g. auger) can vary, thereby resulting in variable amounts of material being fed to the opening in the die holder plate. Reduced amounts of material in the feeder results in reduced pressure on the material that is ultimately fed through the openings in the die holder plate. Increased amounts of material in the feeder results in increased pressure on the material that is ultimately fed through the openings in the die holder plate. By detecting these increases and decreases in pressure, the speed of the cutting blade can be adjusted to obtain more cut product having a length within an acceptable range. By detecting the pressure being exerted on the material being directed into the openings, the cutting blade speed can be increased to account for the increased velocity of the material passing through the dies, or decreased to account for the decreased velocity of the material passing through the dies, thereby maintaining the desired cut length of the material being cut by the cutting blades.

The improved cutting assembly can also and/or alternatively include multiple operational modes. One mode can be a manual mode wherein the speed of the cutting blade is set and maintained at a substantially constant speed throughout an extrusion process. The improved cutting assembly can also include an automatic mode wherein the speed of the cutting blade is adjusted based upon the detected pressure of the material prior to and/or as it is being extruded through the die, the detected velocity of the material prior to, during, and/or after being extruded through the die, and/or detecting the actual and/or calculated length of the cut material. The improved cutting assembly can include one or more adjustable parameters to adjust the length of the extruded material being cut so as to obtain a desired L/D ratio of the cut material, calibrate the pressure so that the speed control for the cutting blade is properly adjusted based upon a particular pressure, adjust the delay so as to delay the adjustment of the speed of the cutting blade to account for the time period in which the material travels into and through a die, etc. The improved cutting assembly can include one or more detectors (camera, light sensor, radio frequency sensor, sound wave sensor, etc.) to monitor the length of the extruded material prior to, during, and/or after the cutting process. This monitored information can be used to provide data on the quality of the material being cut, the percentage of the material being cut that is within an acceptable length, and/or to control the speed of the cutting blade to better obtain a desired cut length of the material. As can be appreciated, the detection of the length of the cut material can be monitored at the location of the cutting blade and/or at some period after the material has been cut (e.g. when the cut material is being conveyed to a drying location, etc.). In such situations, a video monitor or other device can be used to monitor the material being cut and/or conveyed and a software program or other type of statistical device can be used to determine the length and/or the L/D ratio of the cut product and send such information to the controller to be used to adjust the speed of the blade based upon the determined length and/or L/D ratio for the cut catalyst. Such a closed loop system could be used to further simplify the control system (e.g. reduce the number of control switches an operator uses) and/or facilitate in obtaining the desired product quality.

The improved cutting assembly can also and/or alternatively include various features used to deactivate the cutting blade especially when one or more dies are being replaced. It is not uncommon that the dies have to be periodically replaced after a run. A run may be as short as a few minutes or as long as several days or months. When the dies are removed from the openings in the die holder plate, it is important not to inadvertently activate the cutting blades during such operation, wherein such operation could result in the damage to the blades. The improved cutting assembly of the present invention can include one or more detectors, switches, etc. which fully or partially deactivate one or more components of the cutting assembly during repair and/or maintenance of the cutting assembly so as to reduce or prevent damage to one or more components of the cutting assembly. The improved cutting assembly can be also ergonomically designed so as to facilitate in the operation of the cutting assembly and/or to facilitate in the repair and maintenance of the cutting assembly. In one design, the cutting assembly allows the operator to easily access various connectors, bolts, switches, etc. which are required for periodic operation and/or maintenance of the cutting assembly. As a result of this ergonomic design, the need for special tools is reduced or eliminated and/or the operation and/or maintenance of the cutting assembly is simplified, thereby reducing the time and/or cost of maintenance and repair.

DETAILED DESCRIPTION

Figure 1:
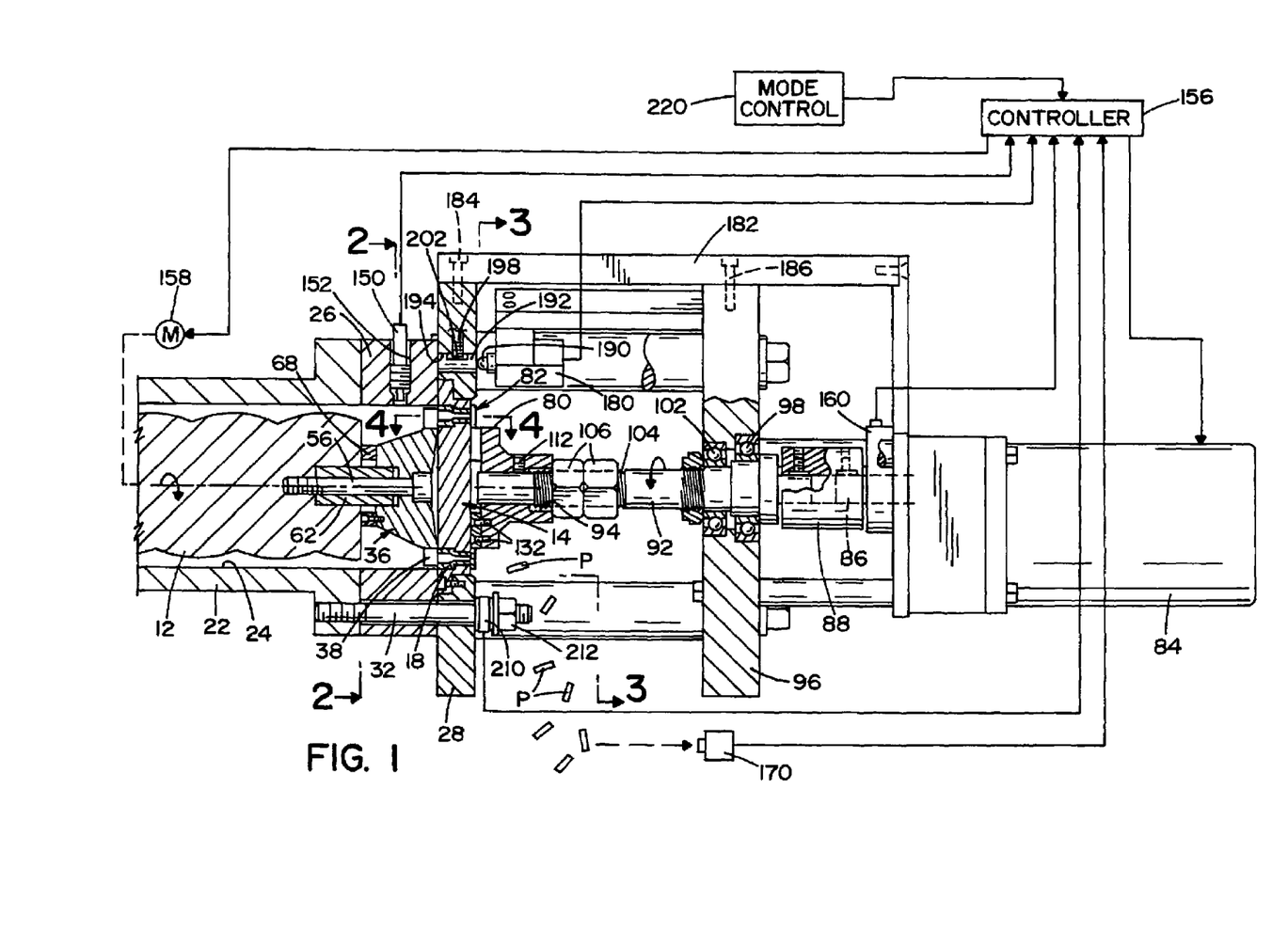
FIG. 1 is a side elevation view, partially in cross section, of a cutting assembly according to an embodiment of the present invention.

With reference to FIG. 1, an auger 12 moves material to be extruded toward a die plate 14 having a plurality of die openings 16 that receive dies 18. The material will become an extruded catalyst; however, the cutting assembly can be used to cut many other types of extruded material. The auger 12 is of the type known in the art and can, for example, have a single flight configuration or a dual flight configuration. The auger 12 is housed in an auger housing 22 that defines a cylindrical opening 24 through which the material to be extruded travels. The die plate 14, in the depicted embodiment, is a circular plate having the plurality of die openings 16 formed through the plate. The dies 18 depicted in the figures are shown in only one configuration for the sake of clarity only. The dies 18 can take numerous configurations that are known in the art.

An annular spacer 26 attaches to an end of the auger housing 22 and an annular die holder 28 attaches to the annular spacer 26 via fasteners 32. The annular spacer 26 and the annular die holder 28 house some of the components of the cutting assembly. These components will be described in more detail below.

Figure 2:
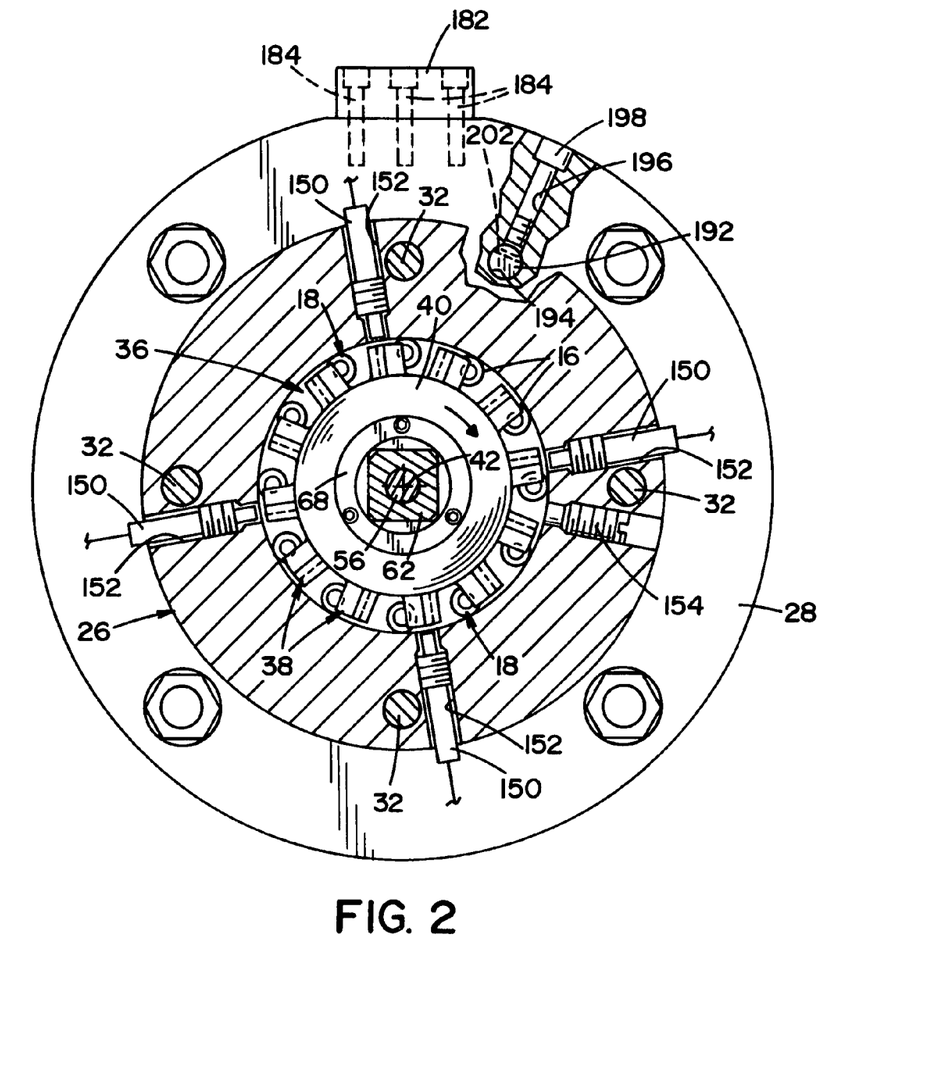
FIG. 2 is a cross-sectional view taken along line 2-2 of FIG. 1.
Figure 4:
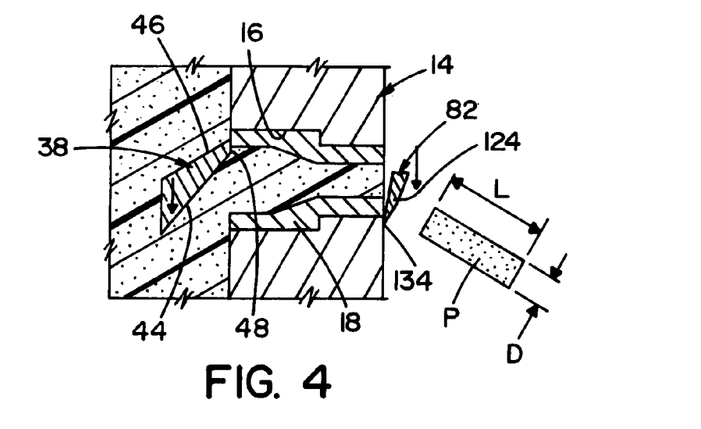
FIG. 4 is a cross-sectional view taken along line 4-4 of FIG. 1.

A wiper 36 attaches to an upstream end face of the auger 12. The wiper includes a plurality of wiper blades 38 that encourage the material to be extruded into the dies 18. With reference to FIGS. 2 and 4, the wiper blades 38 reduce or eliminate space around the die openings 16. The aforementioned space can harbor material that can stagnate or accumulate around the die openings. The wiper blades 38 can also reduce pressure variations of the material to be extruded as it enters into the dies, as compared to systems that do not employ such a wiper.

Figure 5:
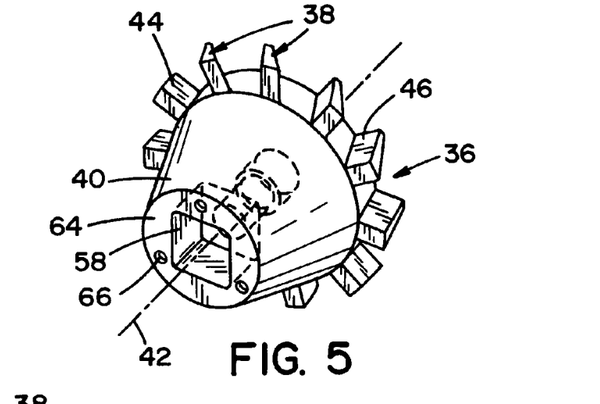
FIG. 5 is a perspective view of a wiper of the cutting assembly of FIG. 1.
Figure 8:
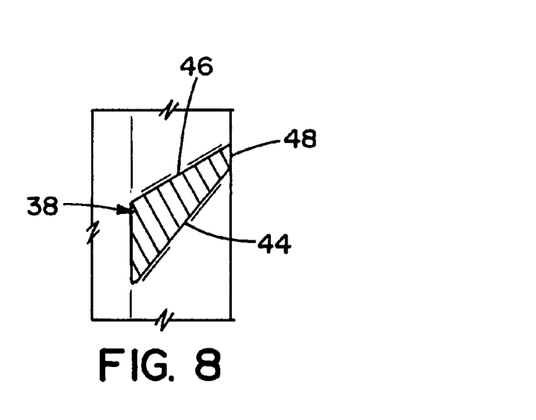
FIG. 8 is a cross-sectional view taken along line 8-8 of FIG. 6.

With reference to FIG. 5, the wiper 36 has a generally frustoconical body 40 that is concentric about a rotational axis 42. The wiper blades 38 extend radially outward from an upstream end of the body 40. With reference to FIG. 8, each wiper blade 38 includes an inclined leading edge 44 and a trailing edge 46, the edges being defined by the direction that the wiper rotates. With reference to FIG. 4, the leading edge 44 is inclined to encourage the movement of material into the die 18. Each wiper blade 38 also includes an outer axial edge 48 that contacts or is positioned closely adjacent an upstream face of the die plate 14. The outer axial edge 48, in the depicted embodiment, is also at least generally parallel to the upstream face of the die plate 14. This configuration reduces the likelihood that a material clogging the dies 18 because the wiper blades 38 remove any hardened material from around the die openings 16.

Figure 6:
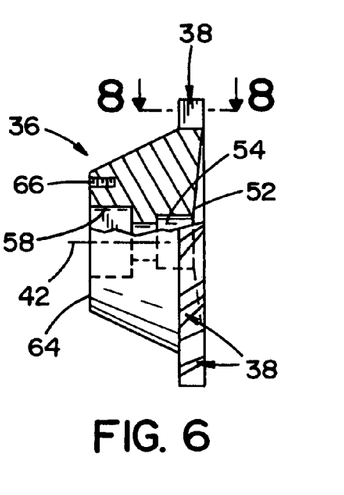
FIG. 6 is a side elevation view, partially in cross section, of the wiper of FIG. 5.
Figure 7:
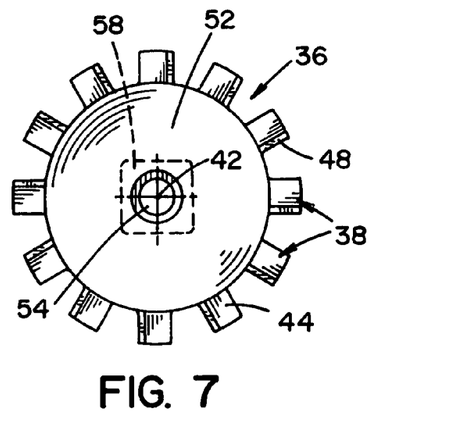
FIG. 7 is an end view of the wiper of FIG. 5.

As mentioned above, the wiper 36 attaches to an end face of the auger 12. With reference back to FIG. 6, the wiper 36 includes a slightly bowl-shaped upstream surface 52 and a central opening 54 beginning in the upstream surface 52 for receiving a fastener 56 (FIG. 1). The fastener 56 is countersunk into the body 40 of the wiper 36 to sit flush with the upstream face 52. The wiper 36 also includes a rear drive block opening 58 aligned along the central axis 42. The drive block opening is polygonal in cross section, which in this embodiment is substantially square. The drive block opening 58 receives a drive block 62 (FIG. 1) that is also received in a corresponding opening provided in the auger 12. The drive block 62 includes a threaded central opening for receiving the fastener 56, and the auger 12 also includes a corresponding threaded opening for receiving the fastener 56. The fastener 56 connects the wiper 36 to the auger 12 and the drive block 62 allows for the rotation of the wiper 36 as the auger 12 rotates.

With reference back to FIG. 5, a downstream face 64 of the wiper 36 includes a plurality of fastener openings 66 that receive fasteners to attach a wiper spacer 68 (FIG. 1) to the wiper for spacing the wiper from the end face of the auger 12. In the depicted embodiment, the wiper spacer 68 is in the form of an annular ring; however, the wiper spacer can comprise a plurality of components, such as a plurality of blocks.

Different sized wipers can be used with the improved cutting assembly. Different sized wipers may be desirable where different dies are being used. It may be desirable to have a certain shaped wiper be used in conjunction with a certain die plate and/or certain dies. As seen in FIG. 2, the number of wiper blades 38 can equal the number of die openings 16. In the embodiment depicted in FIG. 2, each wiper blade 38 extends from a peripheral edge of the body of the wiper 36 a distance that is nearly and/or slightly greater that the diameter of each die opening 16.

Figure 9:
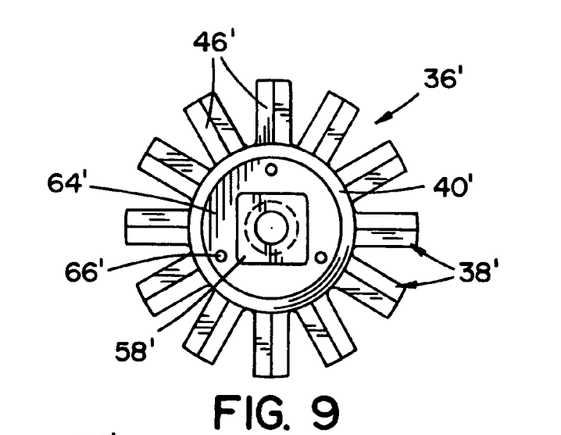
FIG. 9 is an end view of an alternative embodiment of a wiper for use with the cutting assembly of FIG. 1.
Figure 10:
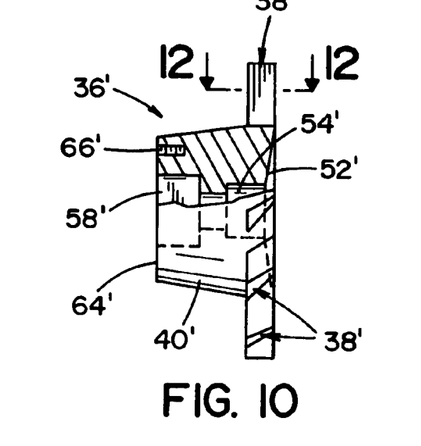
FIG. 10 is a side elevation view, partially in cross section, of the wiper of FIG. 9.
Figure 11:
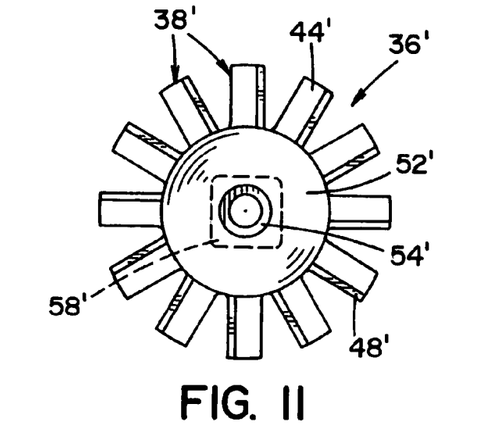
FIG. 11 is an end view, opposite the end shown in FIG. 9, of the wiper of FIG. 9.
Figure 12:
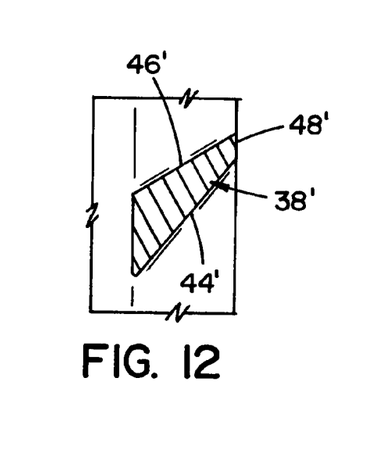
FIG. 12 is a cross-sectional view taken along line 12-12 of FIG. 10.

Reference will now be made to an alternative embodiment of a wiper as shown in FIGS. 9-12, where like numerals having a primed (') suffix will refer to like components of the aforementioned wiper. With reference to FIG. 9, a wiper 36' includes a plurality of wiper blades 38' radially extending from a periphery of a substantially frustoconical body 40'. The wiper blades 38' extend a greater radial distance from the periphery of the wiper body as compared to the wiper blades shown in the embodiment disclosed in FIGS. 5-8. In this embodiment, the wiper blades 38' extend a distance from the peripheral edge of the body 40' a distance greater than the diameter of the die openings 16 shown in FIG. 2. With reference to FIG. 12, each wiper blade 38' includes a leading surface 44' and a trailing surface 46'. Similar to the embodiment depicted in FIGS. 5-8, the leading surface 44' encourages material into the dies 18 (FIG. 1). Each wiper blade 38' also includes an axial end surface 48' that contacts or is positioned closely adjacent to the die plate 14. With reference to FIG. 10, the wiper 36' also includes a bowl-shaped upstream surface 52'. The wiper 36' also includes a fastener opening 54' beginning in the upstream face 52' and the drive block opening 58' extending from a rear face 64'. Fastener openings 66' extend into the body from the rear face 64' to attach a wiper spacer, such as wiper spacer 68 in FIG. 1, to the wiper 36'. The wiper can take many configurations other than those described above.

With reference back to FIG. 1, a rotating cutter head 80 having a plurality of cutter knives 82 cuts the extruded material into cut products P. The cut products P can take a number of different shapes dependent upon the die 18 used to form the cut product. The L/D ratio of the cut product is controlled by way of the systems that will be described below.

The cutter head 80 is rotated by a motor 84. The motor 84 receives power from a power source (not shown). An output shaft 86 extends from the motor 84. A shaft coupling 88 connects the output shaft 86 of the motor 84 to a drive shaft 92. As more clearly seen in FIG. 13, the wiper 80 includes a central opening 94 for receiving the drive shaft 92.

The drive shaft 92 extends through a bearing plate 96 having bearings 98 and 102 disposed therein. The drive shaft 92 can also include a forward threaded section 104 that nuts 106 can threadingly engage to control the location of the cutter head 80 with respect to the die plate 14. The cutter head 80 can also include radial openings 108 (only one is shown in FIG. 13) for receiving fasteners 112 (FIG. 1) for securing the cutter head 80 to the drive shaft 92.

Figure 13:
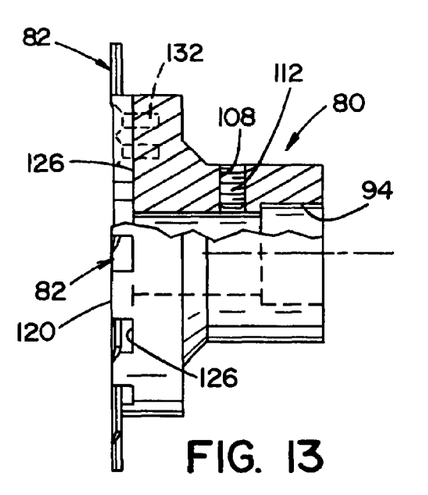
FIG. 13 is a side elevation view, partially in cross section, of a cutter head for use with the cutting assembly of FIG. 1.
Figure 14:
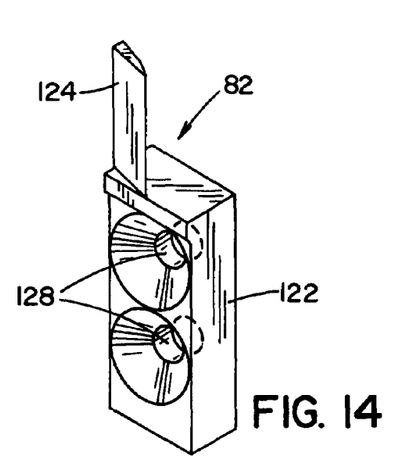
FIG. 14 is a perspective view of a cutter knife that connects to the cutter head of FIG. 13.
Figure 15:
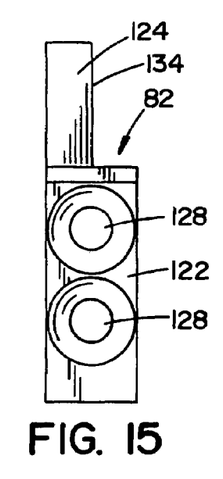
FIG. 15 is a front elevation view of the cutter knife of FIG. 14.
Figure 16:
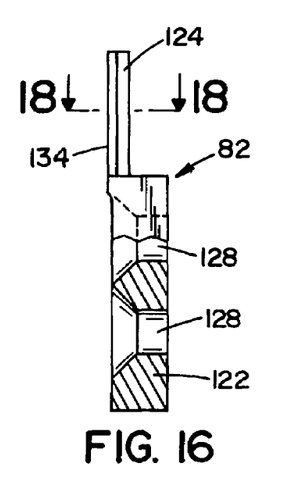
FIG. 16 is a side elevation view, partially in cross section, of the cutter knife of FIG. 14.
Figure 17:
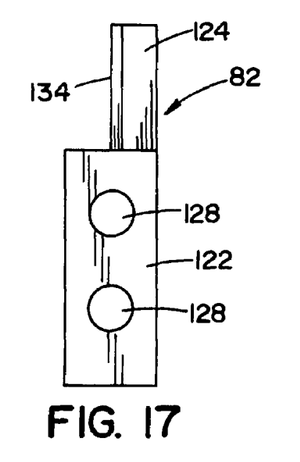
FIG. 17 is a rear elevation view of the cutter knife of FIG. 14.

With reference to FIG. 13, a plurality of cutter knives 82 connect to and radially extend from an upstream face 120 of the cutter head 80. With reference to FIG. 14, each cutter knife 82 includes a lower body portion 122 and a blade 124 extending from the lower body portion. The lower body portion 122 is received in appropriately shaped recesses 126, which in the depicted embodiment are rectangular, formed in the body of the cutter head 80 at the upstream face 120. Each lower body portion 122 also includes fastener openings 128 that receive fasteners 132 (FIG. 1) to attach each cutter knife 82 to the cutter head 80. As is apparent, once a blade 124 dulls, the cutter knife 82 can be replaced from the cutter head 80 by removing the fasteners 132 (FIG. 1) that attach the cutter knife 82 to the cutter head 80. In an alternative embodiment, the cutter head 80 and the cutter knives 82 can be formed as an integral unit.

Figure 18:
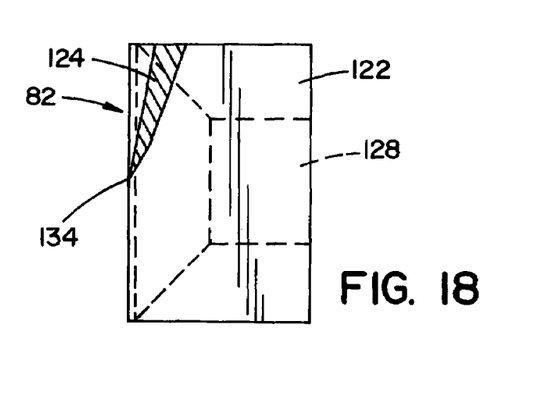
FIG. 18 is a cross-sectional view taken along line 18-18 in FIG. 16.

With reference to FIG. 18, the blade 124 includes a sharpened edge 134 that lies in the same plane as the upstream face 120 of the cutter head 80, or slightly in front of the upstream face of the cutter head. With reference to FIG. 4, the blade 124 is positioned closely adjacent an outlet end of the die 18 so as to cut the cut product P to the desired length. The rate at which material to be extruded enters the die 18 and the rotational velocity of the cutter head 80 control the length of the cut product P.

When the pressure on the extruded material increases, the material travels at a faster rate through the die 18. Conversely, when the pressure on the extruded material reduces, the extruded material passes at a slower rate through the die 18. By detecting the pressure of the material as it enters into one or more openings in the die plate 14, it can be determined whether the material is accelerating, decelerating, or maintaining a constant velocity through the die 18. Pressure transducers 150 are inserted into radial openings 152 in the spacer 26 to detect the pressure of the material as it enters into one or more of the dies 18. With reference to FIG. 2, a plurality of pressure transducers 150 can be supplied into the radial openings 152. Plugs 154 can be inserted into radial openings 152 where no pressure measurements are being made. The pressure transducers 150 can communicate with a controller 156, which communicates with the motor 84. If it is detected that the pressure has decreased, the speed at which the motor 84 rotates the cutter head 80 can be accordingly decreased. If it is found that the pressure of the material has increased, the speed at which the motor 84 rotates the cutter head 80 can be accordingly increased. Furthermore, if it is found that the pressure is constant, the speed at which the motor 84 rotates the cutter head 80 can be maintained constant. As a result, the control of the cutter head 80 can be controlled as a function of the pressure detected upstream of the dies 18 through the controller 156. It may be desirable to also control the rate at which the auger 12 rotates as a function of the pressure upstream from the dies 18. This can be accomplished by allowing the controller 156 to communicate with a motor 158 that drives the auger 12. It also may desirable to control the rate at which the cutter head 80 rotates as a function of the rate at which the auger 12 rotates. This can also be accomplished by the controller 156.

The rotational speed of the output shaft 86 of the motor 84 can be determined using a sensor 160, such as a digital encoder, available from US Digital Corporation. The sensor 160 communicates with the controller 156 which communicates with the motor 84. Accordingly, rotational speed of the output shaft 86, which is connected to the drive shaft 92, can be controlled.

A sensor 170 can also be supplied to check the L/D ratio of the cut product P. In one embodiment, the sensor can be in the form of a camera, or the like, that can detect the dimensions of the cut product P. The sensor 170 communicates with the controller 156. The sensor 170 can send a signal to the controller 156 in response to the detected dimensions of the cut product P. Accordingly, the rotational speed of the cutter head 80 can be adjusted in response to the detected dimensions of the cut product P.

Figure 3:
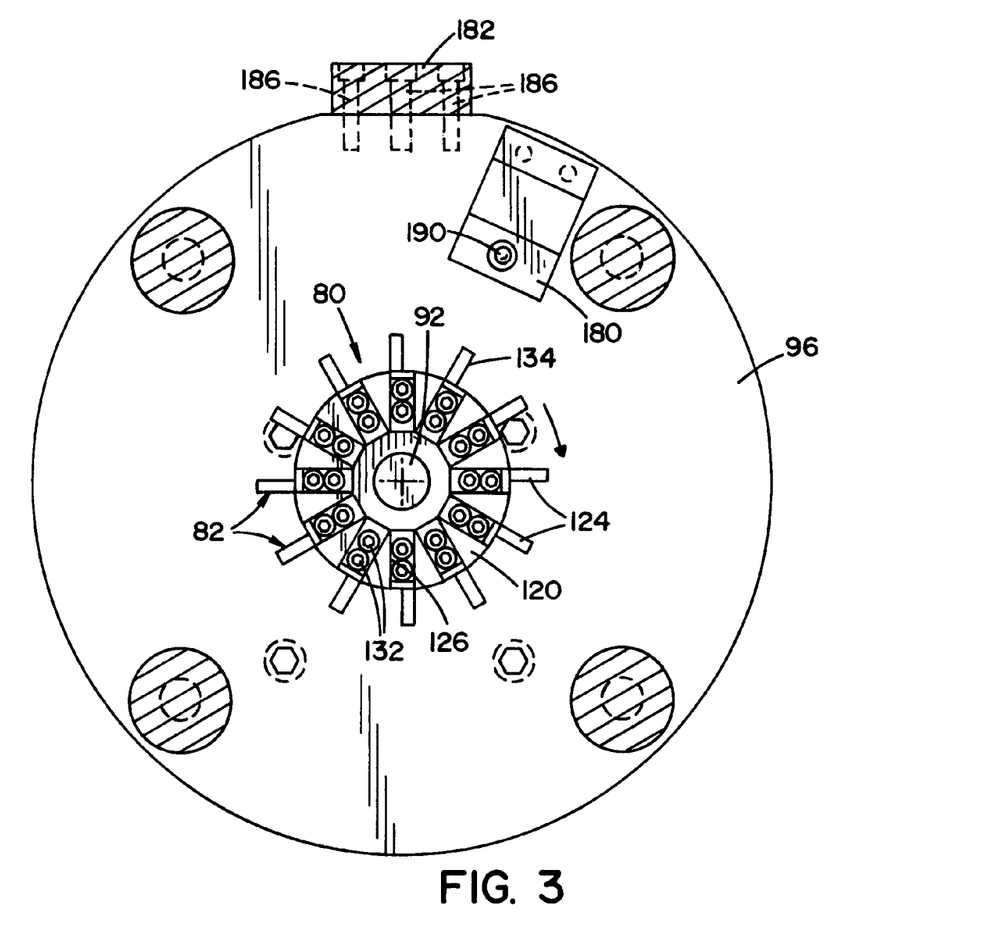
FIG. 3 is a cross-sectional view taken along line 3-3 of FIG. 1.

In addition to controlling the rate at which material is extruded through the dies 16 and the rotational speed of the cutter head 80, various other features can also be incorporated into the cutting assembly. A switch 180 can be provided to communicate with the controller 156. To replace the dies 16, the cutter knives 82, the die plate 14, etc., the assembly is typically disassembled. The die holder 28 and the bearing plate 96 attach to a trolley plate 182. The trolley plate 182 connects to a trolley assembly for moving the cutting assembly. As seen in FIG. 2, a plurality of fasteners 184 connect the die holder 28 to the trolley plate 182. As seen in FIG. 3, a plurality of fasteners 186 also attach the bearing plate 96 to the trolley plate 182.

In the depicted embodiment, the switch 180 includes a button 190 that contacts a dowel 192 disposed in a dowel opening 194 formed in the die holder 28. The dowel opening 194 runs parallel to the central axis of the die holder 28, which is aligned with the drive shaft 92. With reference to FIG. 2, a radial bore 196 extends from a periphery of the die holder 28 into the dowel opening 194. The radial opening 196 receives a fastener 198 which can be received in a notch 202 formed in the dowel 192.

Removal of the die holder 28 results in the button 190 extending outward from the switch 180, which sends a signal to the controller 156 to cut power to the motor 84. The positioning of the button 190 can be adjusted by adjusting the dowel 192 by loosening the fastener 198 in the notch 202 and adjusting the dowel accordingly.

Another sensor 210 can be added to the fastener 32 that connects the die holder 28 to the spacer 26 and the auger housing 22. The sensor 210 can be a load cell-type sensor that is trapped between the die holder 28 and a nut 212. The sensor 210 can detect forces from the die holder 28 and send a signal to the controller 156 to control power delivery the motor 84.

The cutting assembly can also include a mode control 220. The mode control 220 is in communication with the controller 156. One mode can be a manual mode wherein the speed of the cutter head 80 is set and maintained at a substantially constant speed throughout an extrusion process. The improved cutting assembly can also include an automatic mode wherein the speed of the cutter head 80 is adjusted based upon the detected pressure of the material prior to and/or as it is being extruded through the die, the detected velocity of the material prior to, during, and/or after being extruded through the die, and/or detecting the actual and/or calculated length of the cut material. The improved cutting assembly can include one or more adjustable parameters to adjust the length of the extruded material being cut so as to obtain a desired L/D ratio of the cut material, calibrate the pressure so that the speed control for the cutter head 80 is properly adjusted based upon a particular pressure, adjust the delay so as to delay the adjustment of the speed of the cutter head 80 to account for the time period in which the material travels into and through a die, etc.

The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

The invention claimed is:

1. A cutting assembly designed to cut a material extruded from a die plate, the assembly comprising:
    a die plate having a first and second side and at least one die plate opening;
    a wiper designed to be connected or interconnected to an end portion of an auger, said wiper and said end portion of said auger disposed adjacent said first side of said die plate, said wiper including at least one radially disposed wiper blade, said wiper blade designed to direct material into said at least one die plate opening for extrusion through said die plate when said wiper is rotated;
    a cutter head disposed adjacent said second side of said die plate, said cutter head including at least one cutter knife designed to cut material extruded through said at least one opening in die plate, said cutter head connected to a rotating member, said cutter head separate and independent from said wiper and said auger;
    a motor designed to cause said rotating member and said cutter head to at least partially rotate; and,
    a motor controller designed to control a speed of rotation of said motor, said speed of rotation of said motor at least partially independent from a rotation speed of said auger and wiper blade, said speed of rotation of said rotating member selected to cut a desired length of said extruded material that is extruded through said at least one opening in said die plate, said motor controller designed to at least partially control the speed of rotation of said motor based on at least one of a detected pressure of material prior to being extruded through said die plate, a detected pressure of said material as said material is being extruded through said die plate, a detected velocity of said material prior to being extruded through said die plate, a detected velocity of said material as said material is extruded through said die plate, a detected velocity of said material after being extruded through said die plate, and a detected length of the cut material.

2. The cutting assembly as defined in claim 1, wherein said wiper includes a plurality of wiper blades.

3. The cutting assembly as defined in claim 2, wherein said die plate includes a plurality of openings, at least one of said openings includes a removable die insert, said die insert including at least one opening designed to allow said material to be extruded therethrough.

4. The cutting assembly as defined in claim 3, wherein at least one of said wiper blades on said wiper has a length sufficient to fully pass over all of said openings in said die plate when said wiper is rotated.

5. The cutting assembly as defined in claim 4, wherein said detected pressure of said material is at least partially detected by a pressure sensor that is at least partially located in said die plate, at least partially spaced inwardly from said first side of said die plate, and combinations thereof.

6. The cutting assembly as defined in claim 5, wherein said length of said cut extruded material is at least partially detected by a length detector, said length detector including a detector selected from a camera, a light sensor, a radio frequency sensor, or a sound wave sensor.

7. The cutting assembly as defined in claim 6, including an auger motor designed to rotate said auger, said speed of said auger motor is at least partially controlled by at least one of a detected pressure of material prior to being extruded through said die plate, and a detected pressure of said material as said material is being extruded through said die plate.

8. The cutting assembly as defined in claim 7, wherein at least one wiper blade on said wiper includes an inclined leading edge and a trailing edge, said leading edge facing said die plate, said leading edge being at least partially inclined so as to encourage the movement of said material into said at least die plate opening when said wiper blade rotates so as to reduce pressure variations of said material being directed toward said at least one opening.

9. The cutting assembly as defined in claim 8, wherein the motor controller includes a pulse width modulator control system.

10. The cutting assembly as defined in claim 5, including an auger motor designed to rotate said auger, said speed of said auger motor is at least partially controlled by at least one of a detected pressure of material prior to being extruded through said die plate, and a detected pressure of said material as said material is being extruded through said die plate.

11. The cutting assembly as defined in claim 10, wherein at least one wiper blade on said wiper includes an inclined leading edge and a trailing edge, said leading edge facing said die plate, said leading edge being at least partially inclined so as to encourage the movement of said material into said at least die plate opening when said wiper blade rotates so as to reduce pressure variations of said material being directed toward said at least one opening.

12. The cutting assembly as defined in claim 11, wherein the motor controller includes a pulse width modulator control system.

13. The cutting assembly as defined in claim 5, wherein at least one wiper blade on said wiper includes an inclined leading edge and a trailing edge, said leading edge facing said die plate, said leading edge being at least partially inclined so as to encourage the movement of said material into said at least die plate opening when said wiper blade rotates so as to reduce pressure variations of said material being directed toward said at least one opening.

14. The cutting assembly as defined in claim 5, wherein the motor controller includes a pulse width modulator control system.

15. The cutting assembly as defined in claim 3, wherein said detected pressure of said material is at least partially detected by a pressure sensor that is at least partially located in said die plate, at least partially spaced inwardly from said first side of said die plate, and combinations thereof.

16. The cutting assembly as defined in claim 3, including an auger motor designed to rotate said auger, said speed of said auger motor is at least partially controlled by at least one of a detected pressure of material prior to being extruded through said die plate, and a detected pressure of said material as said material is being extruded through said die plate.

17. The cutting assembly as defined in claim 3, wherein at least one wiper blade on said wiper includes an inclined leading edge and a trailing edge, said leading edge facing said die plate, said leading edge being at least partially inclined so as to encourage the movement of said material into said at least die plate opening when said wiper blade rotates so as to reduce pressure variations of said material being directed toward said at least one opening.

18. The cutting assembly as defined in claim 2, wherein said detected pressure of said material is at least partially detected by a pressure sensor that is at least partially located in said die plate, at least partially spaced inwardly from said first side of said die plate, and combinations thereof.

19. The cutting assembly as defined in claim 2, wherein at least one wiper blade on said wiper includes an inclined leading edge and a trailing edge, said leading edge facing said die plate, said leading edge being at least partially inclined so as to encourage the movement of said material into said at least die plate opening when said wiper blade rotates so as to reduce pressure variations of said material being directed toward said at least one opening.

20. The cutting assembly as defined in claim 1, wherein said die plate includes a plurality of openings, at least one of said openings includes a removable die insert, said die insert including at least one opening designed to allow said material to be extruded therethrough.

21. The cutting assembly as defined in claim 20, wherein at least one of said wiper blades on said wiper has a length sufficient to fully pass over all of said openings in said die plate when said wiper is rotated.

22. The cutting assembly as defined in claim 21, wherein said detected pressure of said material is at least partially detected by a pressure sensor that is at least partially located in said die plate, at least partially spaced inwardly from said first side of said die plate, and combinations thereof.

23. The cutting assembly as defined in claim 20, wherein said detected pressure of said material is at least partially detected by a pressure sensor that is at least partially located in said die plate, at least partially spaced inwardly from said first side of said die plate, and combinations thereof.

24. The cutting assembly as defined in claim 20, including an auger motor designed to rotate said auger, said speed of said auger motor is at least partially controlled by at least one of a detected pressure of material prior to being extruded through said die plate, and a detected pressure of said material as said material is being extruded through said die plate.

25. The cutting assembly as defined in claim 1, wherein said detected pressure of said material is at least partially detected by a pressure sensor that is at least partially located in said die plate, at least partially spaced inwardly from said first side of said die plate, and combinations thereof.

26. The cutting assembly as defined in claim 25, including an auger motor designed to rotate said auger, said speed of said auger motor is at least partially controlled by at least one of a detected pressure of material prior to being extruded through said die plate, a detected pressure of said material as said material is being extruded through said die plate.

27. The cutting assembly as defined in claim 25, wherein at least one wiper blade on said wiper includes an inclined leading edge and a trailing edge, said leading edge facing said die plate, said leading edge being at least partially inclined so as to encourage the movement of said material into said at least die plate opening when said wiper blade rotates so as to reduce pressure variations of said material being directed toward said at least one opening.

28. The cutting assembly as defined in claim 1, wherein said length of said cut extruded material is at least partially detected by a length detector, said length detector including a detector selected from a camera, a light sensor, a radio frequency sensor, or a sound wave sensor.

29. The cutting assembly as defined in claim 1, including an auger motor designed to rotate said auger, said speed of said auger motor is at least partially controlled by at least one of a detected pressure of material prior to being extruded through said die plate, a detected pressure of said material as said material is being extruded through said die plate.

30. The cutting assembly as defined in claim 1, wherein at least one wiper blade on said wiper includes an inclined leading edge and a trailing edge, said leading edge facing said die plate, said leading edge being at least partially inclined so as to encourage the movement of said material into said at least die plate opening when said wiper blade rotates so as to reduce pressure variations of said material being directed toward said at least one opening.

31. The cutting assembly as defined in claim 1, wherein the motor controller includes a pulse width modulator control system.

32. A cutting assembly designed to cut a material extruded from an extrusion arrangement, the extrusion arrangement includes a die plate having a first and second side and at least one die plate opening and a displacement arrangement that causes the material to be conveyed to the first side of the die plate and then extruded through the at least one die plate opening to the second side of the die plate, the cutting assembly comprising:
 a cutter head disposed adjacent the second side of the die plate, said cutter head including at least one cutter knife designed to cut the material extruded through the at least one die plate opening, said cutter head connected to a rotating member;
 a motor designed to cause said rotating member and said cutter head to at least partially rotate, said motor not connected to the displacement arrangement; and,
 a motor controller designed to control a speed of rotation of said motor, said speed of rotation of said rotating member selected to cut a desired length of said extruded material that is extruded through said at least one die plate opening, said motor controller designed to at least partially control the speed of rotation of said motor based on at least one of a detected pressure of material prior to being extruded through said die plate, a detected pressure of said material as said material is being extruded through said die plate, a detected velocity of said material prior to being extruded through said die plate, a detected velocity of said material as said material is extruded through said die plate, a detected velocity of said material after being extruded through said die plate, and a detected length of the cut material.

33. The cutting assembly as defined in claim 32, wherein the displacement arrangement includes an auger.

34. The cutting assembly as defined in claim 32, wherein the extrusion arrangement includes a wiper that is positioned adjacent to the first face of the die plate, said wiper designed to direct the material into the at least one die plate opening for extrusion through the die plate.

35. The cutting assembly as defined in claim 32, wherein the extrusion arrangement includes a die insert designed to be positioned in the at least one die plate opening, the die insert includes at least one opening designed to allow the material to be extruded therethrough.

36. The cutting assembly as defined in claim 32, wherein said detected pressure of the material is at least partially detected by a pressure sensor that is at least partially located in the die plate, at least partially spaced inwardly from the first side of the die plate, and combinations thereof.

37. The cutting assembly as defined in claim 32, wherein said length of said cut extruded material is at least partially detected by a length detector, said length detector including a detector selected from a camera, a light sensor, a radio frequency sensor, or a sound wave sensor.

38. The cutting assembly as defined in claim 32, wherein the motor controller includes a pulse width modulator control system.

* * * * *